(12) United States Patent
Dufault et al.

(10) Patent No.: US 11,452,981 B2
(45) Date of Patent: Sep. 27, 2022

(54) INTEGRATED SOLAR MICRO-REACTORS FOR HYDROGEN SYNTHESIS VIA STEAM METHANE REFORMING

(71) Applicant: SOCIETE DE COMMERCIALISATION DES PRODUITS DE LA RECHERCHE APPLIQUEE SOCPRA SCIENCES ET GENIE S.E.C., Sherbrooke (CA)

(72) Inventors: Jean-Francois Dufault, Sherbrooke (CA); Mathieu Picard, Sherbrooke (CA); Luc Frechette, Sherbrooke (CA); Nadi Braidy, Sherbooke (CA)

(73) Assignee: SOCIETE DE COMMERCIALISATION DES PRODUITS DE LA RECHERCHE APPLIQUÉE SOCPRA SCIENCES ET GÉNIE S.E.C., Sherbrooke (CA)

( * ) Notice: Subject to any disclaimer, the term of this patent is extended or adjusted under 35 U.S.C. 154(b) by 240 days.

(21) Appl. No.: 16/764,151

(22) PCT Filed: Nov. 16, 2018

(86) PCT No.: PCT/CA2018/051456
§ 371 (c)(1),
(2) Date: May 14, 2020

(87) PCT Pub. No.: WO2019/095067
PCT Pub. Date: May 23, 2019

(65) Prior Publication Data
US 2020/0391170 A1    Dec. 17, 2020

Related U.S. Application Data

(60) Provisional application No. 62/587,196, filed on Nov. 16, 2017.

(51) Int. Cl.
*B01J 19/00* (2006.01)
*F24S 23/71* (2018.01)
(Continued)

(52) U.S. Cl.
CPC ............. *B01J 19/0093* (2013.01); *C01B 3/34* (2013.01); *F24S 20/20* (2018.05); *F24S 23/30* (2018.05);
(Continued)

(58) Field of Classification Search
CPC .......... B01J 19/0093; B01J 2219/00788; B01J 2219/00792; B01J 2219/00835;
(Continued)

(56) References Cited

U.S. PATENT DOCUMENTS

| 4,549,528 A | 10/1985 | Gibson |
| 5,152,060 A | 10/1992 | Schubert et al. |

(Continued)

FOREIGN PATENT DOCUMENTS

| CA | 2438733 C | 11/2012 |
| CA | 2476217 C | 1/2014 |

(Continued)

OTHER PUBLICATIONS

Agrafiotis et al., "Solar thermal reforming of methane feedstocks for hydrogen and syngas production—A review", Renewable and Sustainable Energy Reviews, vol. 29 (2014), pp. 656-682.

*Primary Examiner* — Brian A McCaig
(74) *Attorney, Agent, or Firm* — Norton Rose Fulbright Canada LLP

(57) ABSTRACT

A reactor for steam-methane reforming is adapted to be received in a tube on a focal axis of a parabolic trough. The reactor may comprise an array of micro-reactors interconnected by a water manifold, a gas manifold, a syngas manifold, and at least one steam-methane reforming cham- (Continued)

ber configured for reforming steam and methane into syngases, the micro-reactors having a vaporization portion for producing steam. Radiation plates may extend on sides of the array of micro-reactors Glazing may face and be spaced apart from a portion of the array of micro-reactors including at least one steam-methane reforming chamber, the glazing being conductively connected to the radiation plates for heat transfer therebetween, the at least one glazing allowing light from the parabolic trough to pass therethrough to reach the array of micro-reactors.

20 Claims, 11 Drawing Sheets

(51) Int. Cl.
*F24S 20/20* (2018.01)
*F24S 23/30* (2018.01)
*C01B 3/34* (2006.01)

(52) U.S. Cl.
CPC ..... *F24S 23/71* (2018.05); *B01J 2219/00792* (2013.01); *B01J 2219/00835* (2013.01); *B01J 2219/00943* (2013.01); *C01B 2203/0233* (2013.01); *C01B 2203/1241* (2013.01)

(58) Field of Classification Search
CPC .... B01J 2219/00943; C01B 3/34; C01B 3/38; C01B 2203/0233; C01B 2203/0283; C01B 2203/0855; C01B 2203/1241; C01B 2203/1288; F24S 20/20; F24S 23/30; F24S 23/71; F24S 23/72; F24S 23/79; F24S 2030/136; F24S 30/425; Y02E 10/47
See application file for complete search history.

(56) References Cited

U.S. PATENT DOCUMENTS

| | | |
|---|---|---|
| 5,811,062 A | 9/1998 | Wegeng et al. |
| 5,973,825 A | 10/1999 | Lasich |
| 6,872,378 B2 | 3/2005 | Weimer et al. |
| 6,932,951 B1 | 8/2005 | Losey et al. |
| 7,087,651 B2 | 8/2006 | Lee-Tuffnell et al. |
| 7,297,324 B2 | 11/2007 | TeGrotenhuis et al. |
| 7,300,635 B2 * | 11/2007 | Bowe ............ B01J 8/067 422/654 |
| 7,435,392 B2 | 10/2008 | Oberbeck et al. |
| 7,537,750 B2 | 5/2009 | Litwin et al. |
| 8,118,889 B2 | 2/2012 | Bowe et al. |
| 8,187,550 B2 | 5/2012 | McAlister |
| 8,673,035 B2 | 3/2014 | Weimer et al. |
| 8,722,747 B2 | 5/2014 | Gamlin et al. |
| 9,011,560 B2 | 4/2015 | Simmons et al. |
| 9,316,124 B2 | 4/2016 | Jin et al. |
| 2006/0140829 A1 | 6/2006 | Tabata et al. |
| 2008/0283109 A1 | 11/2008 | Mankins et al. |
| 2011/0230573 A1 | 9/2011 | McAlister |
| 2013/0025192 A1 | 1/2013 | Wegeng et al. |
| 2016/0060537 A1 | 3/2016 | Hsu |

FOREIGN PATENT DOCUMENTS

| | | |
|---|---|---|
| CA | 2879159 A1 | 1/2014 |
| CA | 2842176 C | 10/2019 |
| DE | 246257 A1 | 6/1987 |
| DE | 3926466 A1 | 2/1991 |
| DE | 10216714 A1 | 1/2004 |
| EP | 1239951 A1 | 9/2002 |
| EP | 1762298 A1 | 3/2007 |
| JP | 2008101908 A | 5/2008 |
| JP | 2016026869 A | 2/2016 |
| WO | 2004091771 A1 | 10/2004 |
| WO | 2016160768 A1 | 10/2016 |
| WO | 2016169865 A1 | 10/2016 |
| WO | 2018127562 A1 | 7/2018 |
| WO | 2019228795 A1 | 12/2019 |

* cited by examiner

INTEGRATED SOLAR MICRO-REACTORS FOR HYDROGEN SYNTHESIS VIA STEAM METHANE REFORMING

CROSS-REFERENCE TO RELATED APPLICATION

The present application claims the priority of U.S. Patent Application No. 62/587,196, filed on Nov. 16, 2017, and incorporated herein by reference.

TECHNICAL FIELD

The present disclosure relates to a system for harvesting solar energy to reform natural gas to synthesize hydrogen or a synthesis gas (e.g., CO and $H_2$).

BACKGROUND OF THE ART

Millions of metric tons of hydrogen are currently consumed every year in North America. In the next few years, hydrogen consumption is expected to grow. If produced from clean sources, hydrogen could even become an excellent energy carrier in the future, but today's hydrogen mainly comes from fossil fuels because of their low process requirements and high availability.

Solar energy is the source of renewable energy typically considered for steam-methane reforming (SMR) as it is an abundant resource and it may satisfy the high temperature required for the SMR reaction when concentrated. Solar-aided reforming appears to be a promising candidate for hydrogen production. However, to achieve a commercial implantation of solar SMR in the market, the technology must be adaptable to a low cost solar concentrator which can be implemented at large scale. There is no report of a successful implementation of an SMR reactor directly on the focal line of a parabolic trough, which are the most widely used and cheaper solar concentrators.

SUMMARY

It is an aim of the present disclosure to provide a solar micro-reactor configuration that addresses issues related to the prior art.

Therefore, in accordance with a first embodiment of the present disclosure, there is provided a reactor for steam-methane reforming, the reactor adapted to be received in a tube on a focal axis of a parabolic trough, the reactor comprising: an array of micro-reactors interconnected by a water manifold, a gas manifold, a syngas manifold, and at least one steam-methane reforming chamber configured for reforming steam and methane into syngases, the micro-reactors having a vaporization portion for producing steam; radiation plates extending on sides of the array of micro-reactors; and at least one glazing facing and spaced apart from a portion of the array of micro-reactors including at least one steam-methane reforming chamber, the glazing being conductively connected to the radiation plates for heat transfer therebetween, the at least one glazing allowing light from the parabolic trough to pass therethrough to reach the array of micro-reactors.

Further in accordance with the first embodiment, for instance, a water-gas shift chamber may be downstream of the at least one steam-methane reforming chamber.

Still further in accordance with the first embodiment, for instance, the array of micro-reactors is constituted of an alternating sequence of a first plate and of a sequence plate, pairs of adjacent ones of the first plate and of the second plate forming one reactor, the reactors commonly sharing the water manifold, the gas manifold and the syngas manifold.

Still further in accordance with the first embodiment, for instance, the reactors commonly share the steam-methane reforming chamber.

Still further in accordance with the first embodiment, for instance, the plates are 2.5D metallic plates defining fluid paths between vaporization portion and the at least one steam-methane reforming chamber.

Still further in accordance with the first embodiment, for instance, the manifolds are defined by throughbores in the stack of first plate and second plate.

Still further in accordance with the first embodiment, for instance, the radiation plates conductively contact the micro-reactors at the vaporization portion.

Still further in accordance with the first embodiment, for instance, the radiation plates are spaced apart from the micro-reactors at the at least one steam-methane reforming chamber.

Still further in accordance with the first embodiment, for instance, the radiation plates have low emissivity polished exposed surfaces.

Still further in accordance with the first embodiment, for instance, the radiation plates are made of copper.

Still further in accordance with the first embodiment, for instance, the glazing is a spectrally selective glazing for transmission of short wavelength radiation through the glazing and absorption of infrared radiation or reflection of infrared radiation to the micro-reactors.

Still further in accordance with the first embodiment, for instance, the glazing has a thickness ranging from 0.25 mm to 4.0 mm.

Still further in accordance with the first embodiment, for instance, a steam-methane reforming system comprises a parabolic trough adapted to be rotatably mounted to a structure, the parabolic trough having a reflective concave surface, a tube located on a focal axis of the parabolic trough, the tube allowing radiation to pass therethrough, the reactor as described above or herein, the reactor being received inside the tube, wherein the at least one glazing is located to allow light from the parabolic trough to pass therethrough to reach the array of micro-reactors of the reactor.

In accordance with a second embodiment of the present disclosure, there is provided a steam-methane reforming system comprising: a parabolic trough adapted to be rotatably mounted to a structure, the parabolic trough having a reflective concave surface; concentrators located at or in proximity to a focal axis of the parabolic trough, for radiation to be reflected from the parabolic trough to the concentrators; a plurality of micro-reactors, the micro-reactors comprising at least one steam-methane reforming chamber configured for reforming steam and methane into syngases, the micro-reactors having a vaporization portion for producing steam; wherein the micro-reactors are respectively paired with one of the concentrators, with the at least one steam-methane reforming chamber located of the micro-reactors located on a focal point of the respective concentrators.

Further in accordance with the second embodiment, for instance, a tube may allow radiation to pass therethrough, the plurality of micro-reactors being in the tube.

Still further in accordance with the second embodiment, for instance, chambers may allow radiation to pass therethrough and receiving individual ones of the micro-reactors.

Still further in accordance with the second embodiment, for instance, the chambers are bulb shaped.

Still further in accordance with the second embodiment, for instance, the micro-reactors include a neck projecting from the chambers, a female socket rotatably mounted to the neck for engagement with a male base adapted to feed methane and water to the micro-reactors and to receive syngases from the micro-reactors.

Still further in accordance with the second embodiment, for instance, a water manifold, a gas manifold, a syngas manifold may be commonly shared by the micro-reactors.

Still further in accordance with the second embodiment, for instance, radiation plates may extend on sides of the micro-reactors.

Still further in accordance with the second embodiment, for instance, the radiation plates conductively contact the micro-reactors at the vaporization portion.

Still further in accordance with the second embodiment, for instance, the radiation plates are spaced apart from the micro-reactors at the at least one steam-methane reforming chamber.

Still further in accordance with the second embodiment, for instance, the radiation plates have low emissivity polished exposed surfaces.

Still further in accordance with the second embodiment, for instance, the radiation plates are made of copper.

Still further in accordance with the second embodiment, for instance, at least one glazing may face and be spaced apart from the portion of the micro-reactors including the at least one steam-methane reforming chamber, the glazing being conductively connected to the radiation plates for heat transfer therebetween, the at least one glazing allowing light from the concentrators to pass therethrough to reach the micro-reactors.

Still further in accordance with the second embodiment, for instance, the glazing is a spectrally selective glazing for transmission of short wavelength radiation through the glazing and absorption of infrared radiation or reflection of infrared radiation to the micro-reactors.

Still further in accordance with the second embodiment, for instance, the glazing has a thickness ranging from 0.25 mm to 4.0 mm.

Still further in accordance with the second embodiment, for instance, the micro-reactors include water-gas shift chamber downstream of the at least one steam-methane reforming chamber.

Still further in accordance with the second embodiment, for instance, the micro-reactors are made of 2.5D metallic plates defining fluid paths between vaporization portion and the at least one steam-methane reforming chamber.

Still further in accordance with the second embodiment, for instance, the concentrators are optical lenses.

Still further in accordance with the second embodiment, for instance, the concentrators are reflective concentrators.

Still further in accordance with the second embodiment, for instance, a mechanism may be pivotally connected to the concentrators for changing an orientation of the concentrators relative to the micro-reactors.

Still further in accordance with the second embodiment, for instance, the mechanism is shared by the concentrators.

DETAILED DESCRIPTION

Figure 1:
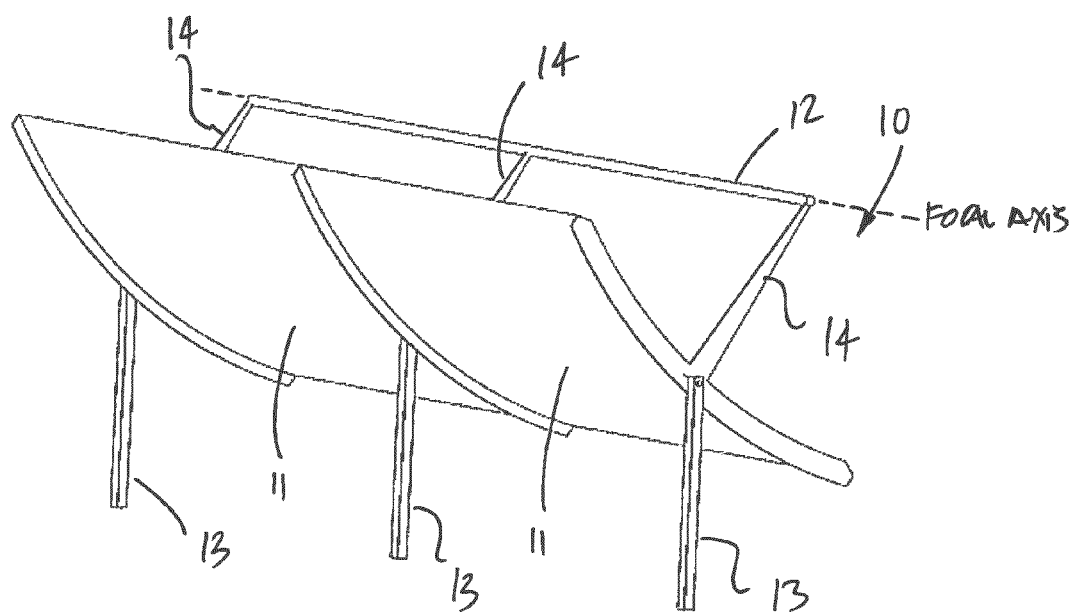
FIG. 1 is a perspective view of a parabolic trough featuring an array of micro-reactors in accordance with an embodiment of the present disclosure, at the focal line of the parabolic trough.
Figure 11:
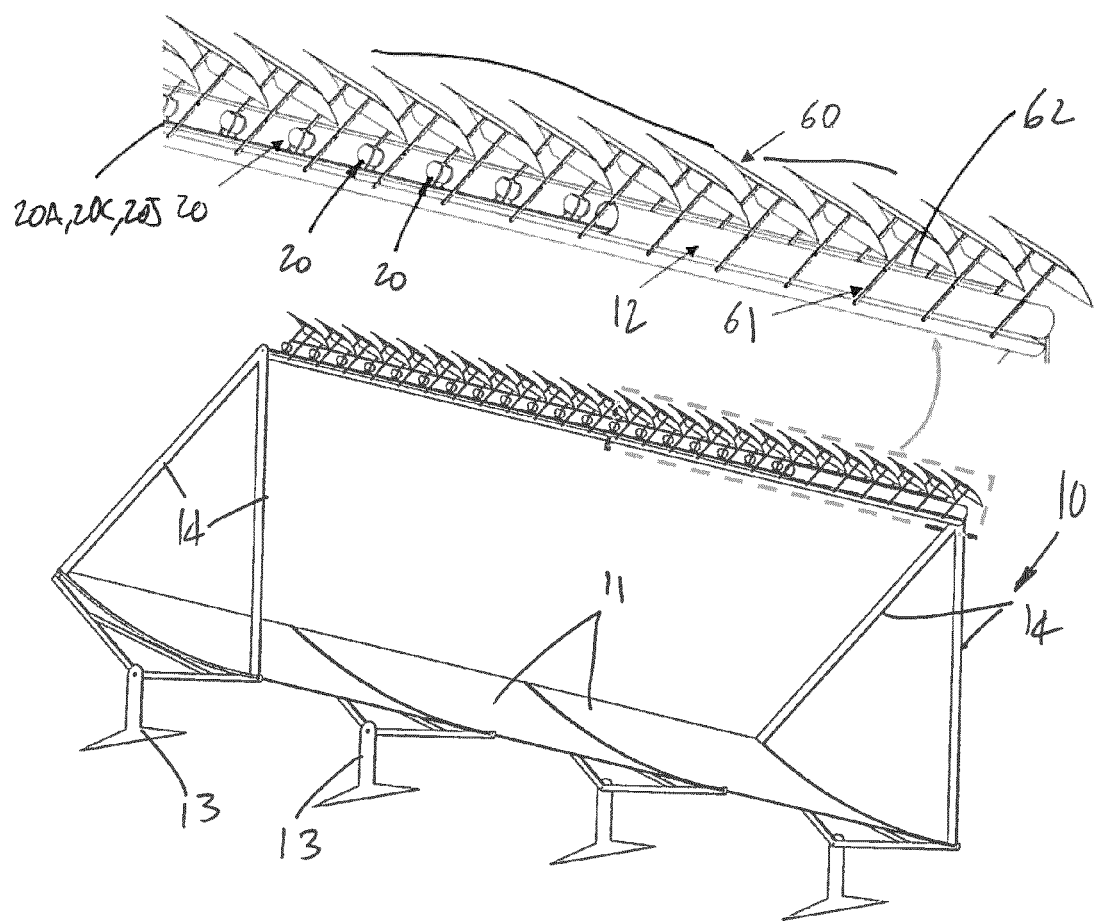
FIG. 11 is a perspective view of a parabolic trough featuring discrete micro-reactors with second-stage reflective concentrators in accordance with another embodiment of the present disclosure.

Referring to the drawings and more particularly to FIG. 1, there is illustrated a parabolic trough 10 featuring an array of micro-reactors in accordance with an embodiment of the present disclosure. Although the present disclosure gives the example of parabolic trough 10, the array of micro-reactors described herein can be used in other types of concentrators, such as solar towers, parabolic dishes, etc. The parabolic trough 10 may be of the type featuring mirror(s) 11. The mirror(s) 11 have a parabolic section when taken in a plane to which a focal axis is normal. The mirror(s) 11 may have any appropriate construction, such as a metallic structure with a reflective surface. A tube is generally shown at 12 and encloses the array of micro-reactors as described below. The tube 12 is positioned on the focal axis of the mirror(s) 11 by supports 13, whereby sun rays are reflected by the mirror(s) 11 onto the tube 12. As described herein, the focal axis may be on micro-reactors. The tube 12 is transparent and/or translucent. The mirror(s) 11 is pivotally mounted to a structure 14, in such a way that the orientation of the mirror 11 may be actuated and varied to orient the mirror(s) 11 toward the sun as a function of time of day. Moreover, in a particular embodiment, the parabolic trough 10 as a whole, i.e., including the structure 14, may be displaced relative to the ground to orient the parabolic trough 10 relative to the sun as a function of time of year. For example, in an embodiment, the parabolic trough 10 may be rotatable relative to a vertical axis. However, the parabolic trough 10 may also be fixed to the ground by the structure 14. Another arrangement of parabolic trough 10 is shown in FIG. 11 and is described in further detail hereinafter.

Figure 2:
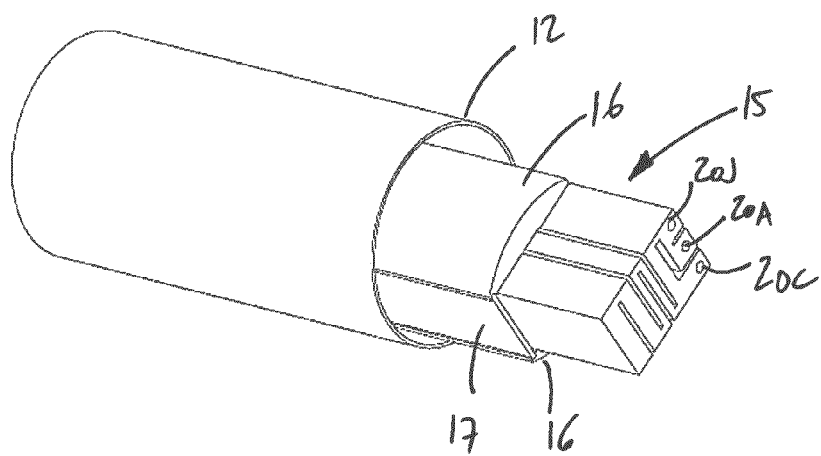
FIG. 2 is an assembly view of an array of micro-reactors inside a tube and insulated by radiation plates and glazing.
Figure 3:
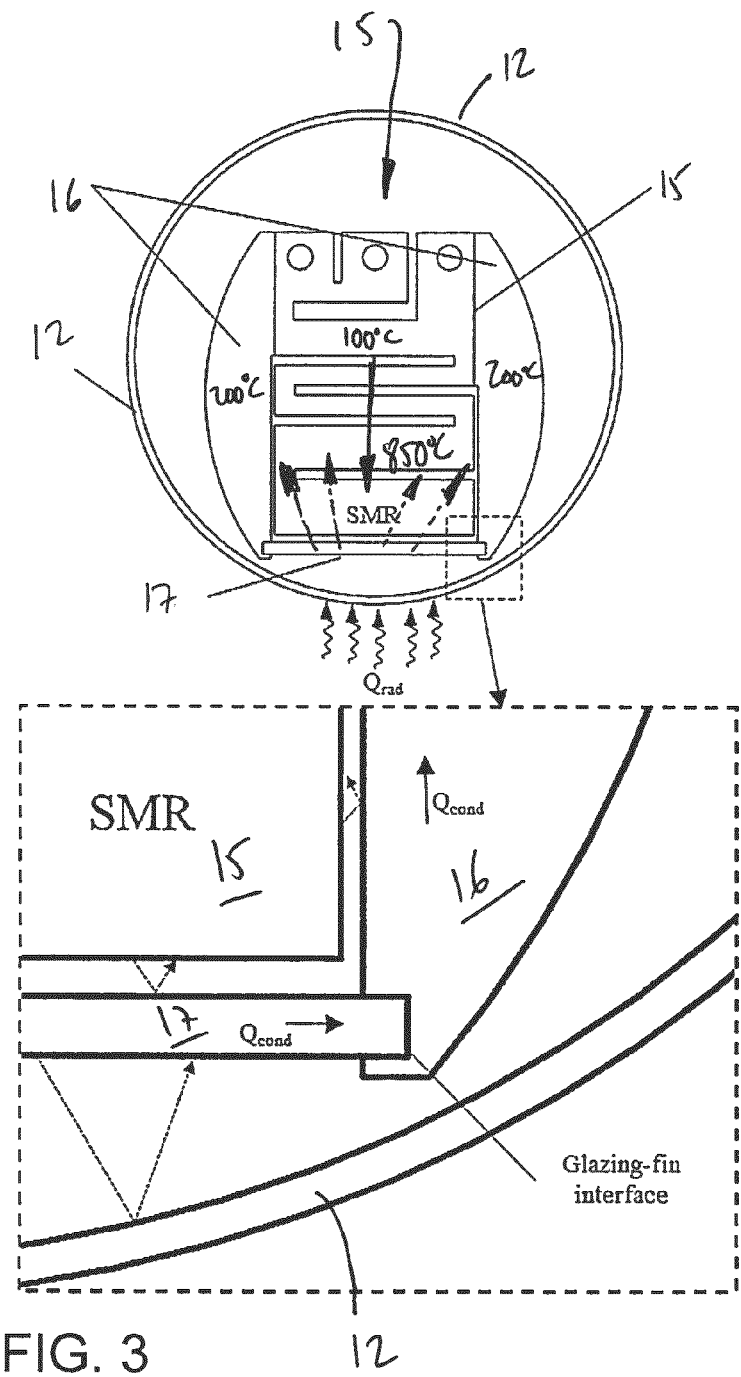
FIG. 3 is an end view of the array of micro-reactors inside a tube and insulated by radiation plates and glazing.

Referring to FIGS. 2 and 3, a steam-methane reforming (SMR) reactor in accordance with an embodiment of the present disclosure is shown in an interior of the tube 12. The SMR reactor may include an array of micro-reactors illustrated at 15. The array may be located inside the tube 12, along with radiation plates 16 and glazing 17 connected to the radiation plates 16. The connection may be conductive and/or may involve insulation to control the flow of energy to the radiation plates 16. The reactor is supported at opposed ends, but may not be in contact with an interior surface of the tube 12, as shown in FIG. 3. In an embodiment, a vacuum or quasi vacuum is present in the tube 12, to facilitate the absorption of energy by the reactor and reduce heat losses by convection. As an alternative, the tube 12 may be filled with an inert gas. The radiation plates 16 are provided on the sides of the array 15, and contact a vaporization portion of the array 15, while being spaced apart from SMR chamber(s) of the array 15, as described below. The radiations plates 16 surround the array 15 to redirect the radiation losses to the array 15. The non-reflected energy is absorbed by the plates 16 and transported towards a vaporizer portion of the array of micro-reactors 20, as described hereinafter. Glazing 17 may face a bottom of the array 15. The glazing 17 may be one or more transparent or translucent panels that allows the solar rays to reach the array 15 and absorbs the major part of the re-radiated infrared radiations, as also described hereinafter. Stated differently, the glazing 17 is a transparent or translucent member through which the rays pass on their way to the array 15 (on the focal axis) when reflected by the mirrors 11. The thermal conductivity of the plate 16-array 15 and glazing 17-plate 16 interfaces may be modified to control the glazing and plate temperature. This may be done to balance vaporization heat requirements and to maintain the glazing 17 below a threshold temperature for the glazing 17 to preserve its optical properties.

Figure 4:
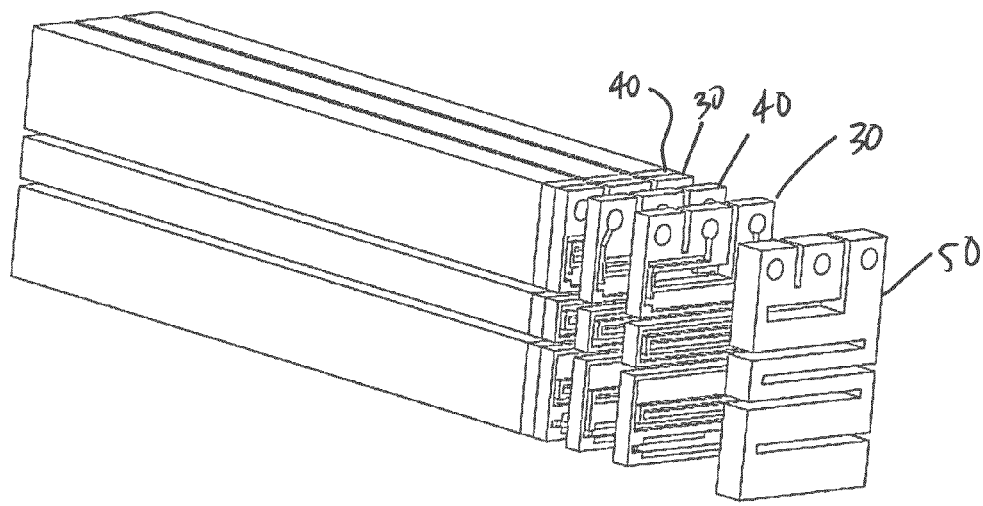
FIG. 4 is an assembly view of the array of micro-reactors in accordance with an embodiment of the present disclosure.
Figure 5:
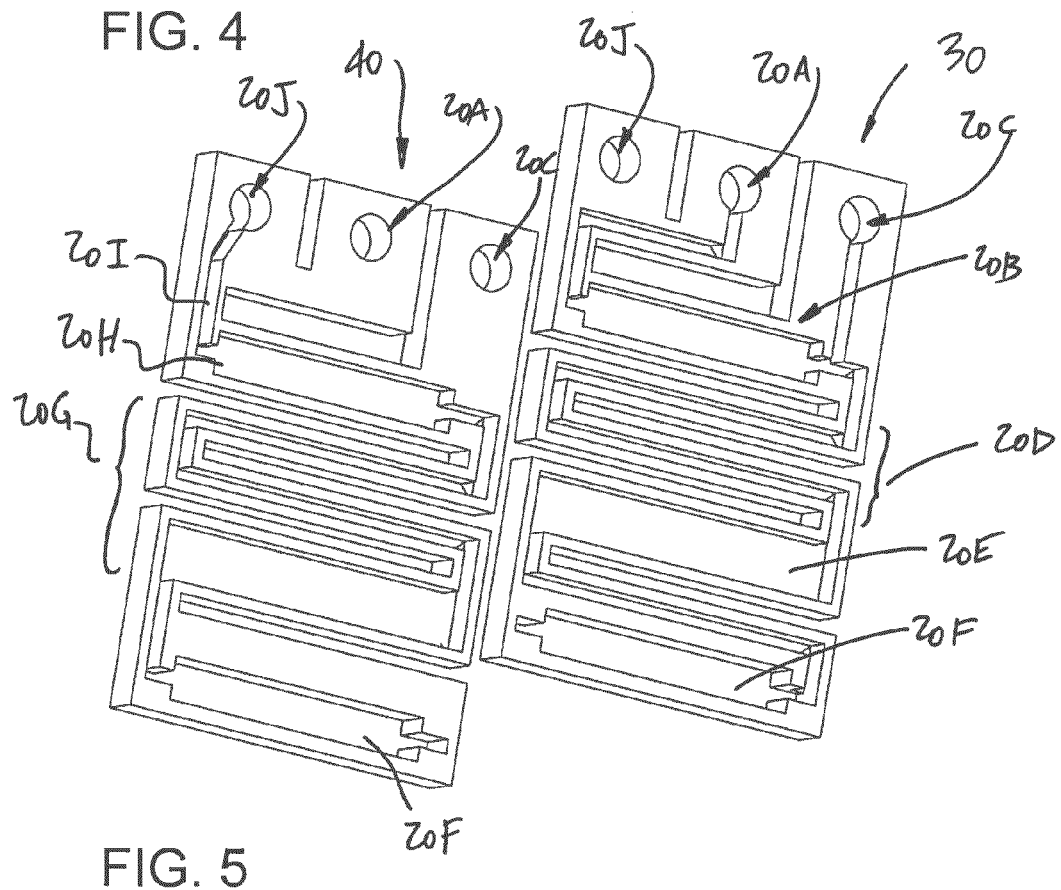
FIG. 5 is a perspective view of a first plate and a second plate concurrently forming a micro-reactor in accordance with the present disclosure.

Referring to FIGS. 4 and 5, an embodiment is shown in which each of the micro-reactors 20 is made of a first plate 30 and a second plate 40. According to an embodiment, the construction of the array 15 of micro-reactors 20 is inspired from microelectronics, in which several identical units are produced in batches, for example the first plate 30 and the second plate 40, and joined in parallel to increase the system's power. Other plates may also be present, such as end plates 50, as described hereinafter. The plates 30 and 40 are described hereinafter, but in an embodiment each micro-reactor 20 is made of pairs of 2.5D metallic plates containing all the endothermic and exothermic sub-units required to complete a reforming process. The micro-reactors 20 are then stacked in parallel to form the array 15 shown in FIG. 2. In an embodiment, the plates 30 and 40 are bonded in any appropriate way to define a monoblock. For instance, the plates 30 and 40 may be diffusion-bonded such that the array 15 may be a monolithic block unit. As another example of a manufacturing process, among others, the plates 30 and 40 may be 3D printed. A plurality of blocks of arrays 15 may be in the tube 12 in the stack shown in FIG. 4. The stack of plurality of blocks of arrays 15 may be located on the focal axis of the parabolic trough 10. Reagents and products may flow in common manifold lines to each block of array 15.

Referring to FIGS. 2-5, the reforming process is now explained relative to the micro-reactors 20. Liquid water flows into water manifold 20A in the array(s) 15 from the cold side, and enters a vaporizer portion 20B in the first plate 30. For example, tubes or pipes are connected to the manifold 20A, and other manifolds described herein. Due to temperature in the vaporizer portion 20B, and the sectional increase in the flow path at the vaporizer portion 20B (forming a reservoir), the water vaporizes in the vaporizer section 20B. A gas, such as methane in the case of SMR, flows into a gas manifold 20C in the array(s) 15 and then mixes with the steam exiting from the vaporizer portion 20B. The reagents, i.e., methane and water/steam then pass through a heat exchanger portion 20D before entering an SMR reactor chamber(s) 20E-20F packed with a catalyst. The reagents may consequently be heated beyond a temperature threshold for reforming. In parallel, the reagents recuperate heat from the reagents exiting the micro-reactors 20, as the heat exchanger portion 20D shares a wall with a heat exchanger portion on the exit path (20G, described after) This may include a sequence of a low temperature reforming reactor chamber 20E and a high temperature reforming reactor chamber 20F as in the illustrated embodiment, or a single reactor chamber as well. The reforming reaction occurs at this point, for example: $CH_4+H_2O \rightarrow CO+3H_2$ The reforming products then exit the first plate 30 to reach the second plate 40. According to an embodiment, the reforming reactor chamber 20F is concurrently defined by the first plate 30 and the second plate 40. Stated differently, the portion of the reforming reactor chamber 20F in the first plate 30 extends from face to face. The reforming products cool down in heat exchanger portion 20G and enter a water-gas shift (WGS) reactor portion 20H. The WGS reactor portion 20H may be present to reoxyde the CO, according to the following reaction: $CO+H_2O \rightarrow CO_2+H_2$. The WGS reactor portion 20H may be optional, as it may not be required to reoxyde the CO in the micro-reactor 20. The generated heat in the WGS reactor portion 20H as well as a part of the sensible energy is then used to vaporize the inflow of water. The gas finally passes through a low temperature heat exchanger portion 20I where it releases energy to preheat the liquid water in the vaporizer portion 20B, by heat exchange, as the vaporizer portion 20B and the heat exchanger portion 20I are aligned (i.e., back to back). The remaining energy needed to vaporize water comes from the conduction inside the micro-reactors 20's walls as well as the energy absorbed by the radiation plates 16 and conductively transmitted to the vaporizer portion 20B. The syngases exit the array 15 via a syngas manifold 20J.

Referring to FIG. 3, exemplary temperatures are shown, along with heat flux arrows. By way of the arrangement described above, including the radiation plates 16 and the glazing 17, the highest temperature is located in the center, at the SMR reactor chambers 20E-20F. The energy consumption at the vaporizer portion 20B allows the rest of the micro-reactor 20 to stay at lower temperatures. The radiation plates 16 conduct the energy absorbed by the glazing 17 to the vaporizer portion 20B. It is observed that the various components of the reactor are distributed as a function of the radial temperature gradient of the high temperature SMR reactor chamber 20F.

Now that the micro-reactors 20 have been generally described with reference to the reforming process, each of the plates 30 is described individually.

Figure 6:
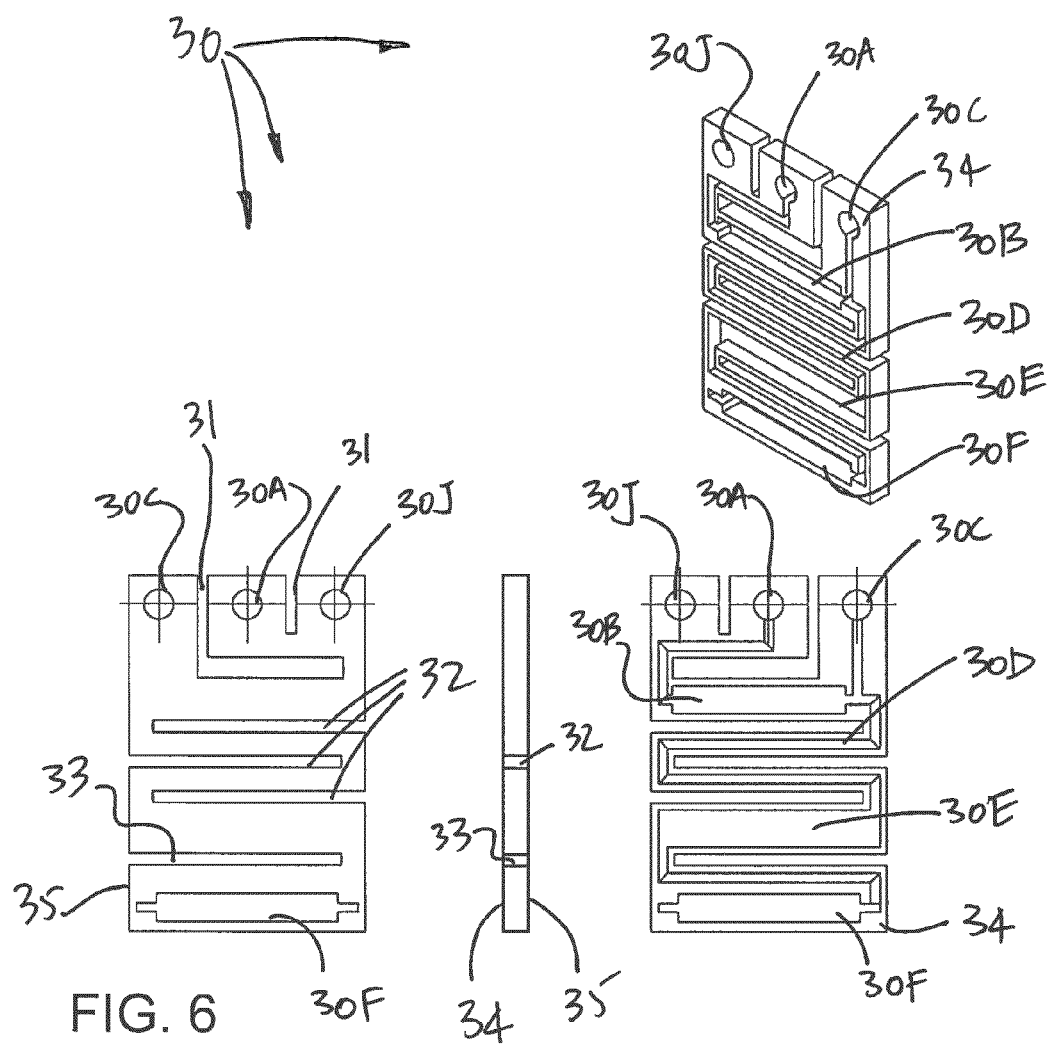
FIG. 6 is a series of views of the first plate of the micro-reactor of FIG. 5.

Referring to FIGS. 5 and 6, the first plate 30 is shown as having a throughbore 30A for forming the water manifold 20A when the first plate 30 is stacked in the array 15. A channel 30B with enlarged portion diverges from the throughbore 30A and defines the vaporizer portion 20B of the micro-reactor 20. The enlarged portion with subsequent narrowing, as present in an embodiment of the vaporizer portion 20B may increase residency time of water in the vaporizer portion 20B, so as to allow the water to vaporize. The first plate 30 also has a throughbore 30C for forming the gas manifold 20C when the first plate 30 is stacked in the array 15. A channel extends from the throughbore 30C to converge with the channel 30B into channel 30D that is part of the heat exchanger portion 20D, thus downstream of the vaporizer portion 20B.

A chamber 30E is then formed at the end of the channel 30D, and is filled with catalyst on its surface, to define the LT SMR reactor chamber 20E. As an alternative, the catalyst may be in the form of a powder and/or of granules in the chamber 30E and slot 30F-40F, in a packed bed reactor configuration. A conduit extends from the chamber 30E to a slot 30F, which slot 30F is part of the HT reactor chamber 20F. As the slot 30F extends through the first plate 30 (i.e., from face to face), the reagents can flow from the first plate 30 to the second plate 40. At a top of the first plate 30, a throughbore 30J is isolated from a remainder of the channels and chambers of the first plate 30. The throughbore 30J is part of the syngas manifold 20J when the first plate 30 is stacked in the array 15.

It is observed that the first plate 30 is not rectangular, as some cutouts are defined through the first plate 30 from face to face. The cutouts are open to ambient in the tube 12, whereby they define heat exchange surfaces to assist in the heat exchange between ambient and the various portions of the micro-reactor 20. For example, cutouts 31 assist in forming the vaporizer portion 20B. As another example, cutouts 32 define a coil shape in the plate 30, which forms part of the heat exchanger portion 20D. Finally, cutout 33 separates the reactor chamber(s) 20E-20F from one another. It is contemplated to provide the first plate 30 without such cutouts 32 and/or 33, though the cutouts may enhance the SMR process by contributing to the heat exchange.

As shown in FIG. 6, the majority of the afore-mentioned components are in a front face 34 of the first plate 30, with the rear face 35 only showing the throughbores 30A, 30C and 30J, and the slot 30F. A remainder of the rear face 35 is planar. This contributes to concealing the various channels and chambers of adjacent plates 30 and 40, as detailed hereinafter.

Figure 7:
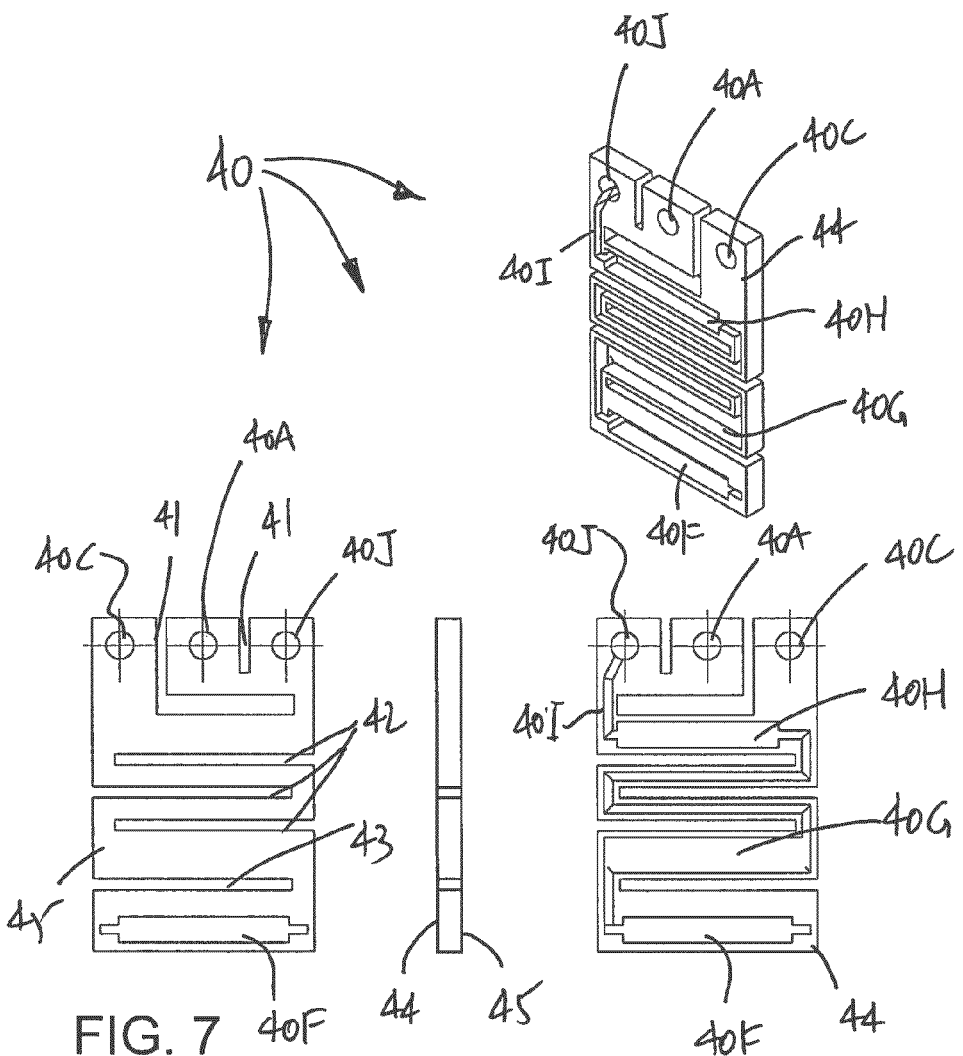
FIG. 7 is a series of views of the second plate of the micro-reactor of FIG. 5.

Referring to FIGS. 5 and 7, the second plate 40 is shown in greater details. Throughbores 40A and 40C are isolated at a top of the second plate 40, and respectively part of the water manifold 20A and the gas manifold 20C when the second plate 40 is stacked in the array 15. The second plate has a slot 40F, which slot 40F is part of the HT reactor chamber 20F. The reagents can flow from the first plate 30 to the second plate 40 and access the slot 40F. As the slot 40F extends through the second plate 40, the HT reactor chamber 20F extends all along the array 15 in the illustrated embodiment. A channel 40G with enlarged portion extends from the slot 40F, and forms the heat exchanger portion 20G for the reforming products to cool down. A subsequent channel 40H forms the WGS reactor portion 20H, and may have a larger cross-section subsequently narrowing, to increase the residency time of the reforming products in the WGS reactor portion 20H. Then, channel 40I, defining the low temperature heat exchanger portion 20I, extends from the channel 40H to a syngas throughbore 40J. The throughbore 40J is part of the syngas manifold 20J when the second plate 40 is stacked in the array 15.

It is observed that the second plate 40 as the same peripheral outline as the first plate 30, with cutouts defined through the second plate 40 from face to face. The cutouts are open to ambient in the tube 12, whereby they define heat exchange surfaces to assist in the heat exchange between ambient and the various portions of the micro-reactor 20. Cutouts 41 assist in forming the WGS reactor portion 20H with the channel 40H, and the heat exchanger portion 20I with the channel 40I. The cutouts 42 define the coil shape in the second plate 40, which forms part of the heat exchanger portion 20G. Cutout 43 separates the reactor chamber 20F from the heat exchanger portion 20G. As was the case for the first plate 30, it is contemplated to provide the second plate 40 without such cutouts 42 and/or 43, though the cutouts 42 and 43 may enhance the heat exchange with the reagents on the other side of the reactor 20 in the first plate 30.

As shown in FIG. 7, the majority of the afore-mentioned components are in a front face 44 of the first plate 40, with the rear face 45 only showing the throughbores 40A, 40C and 40J, and the slot 40F. A remainder of the rear face 45 is planar. When plates 30 and 40 are stacked in alternating sequence, the rear face 35 of the first plate 30 is against the front face 44 of the second plate 40. Accordingly, the channels and chambers in the front face 44 of the second plate 40 are closed off by the rear face 35 of the first plate 30. The opposite concept applies to the rear face 45 of the second plate 40 being against the front face 34 of the first plate 30. The manifolds are formed by the alignment of the pairs of throughbores 30A-40A, 30C-40C and 30J-40J. Likewise, the HT reactor chamber 20F is formed by the alignment of the pairs of slots 30F-40F, for a lengthwise HT reactor chamber 20F shared by the micro-reactors 20, i.e., a common reactor chamber 20F for a plurality of micro-reactors 20. It is however contemplated to have separate HT reactor chambers 20F for each set of first plate 30/second plate 40. End plates, such as 50, may be required with the same cutout contours and the pairs of throughbores 30A-40A, 30C-40C and 30J-40J, to close off the HT reactor chamber 20F, and one of the first plates 30. Moreover, although two plates are described, i.e., 30 and 40, as they represent a convenient and cost-efficient solution, some manufacturing techniques allow the creation of a single plate having the combined features of the plates 30 and 40. For example, such single plate with combined features could be 3D printed. Moreover, the 3D printing could form the array 15 of micro-reactors 20 as a single block.

Using this two-dimensional approach, the plates 30, 40 and 50 can be manufactured by a standard batch process such as etching, punching and laser cutting. These manufacturing methods are compatible with a high volume production economy, instead of a scale economy typical to solar towers. Yet, the array 15 could also be used in solar towers of parabolic dishes.

The plates 30 and 40 of the elementary reactors 20 are placed so that the temperature increases linearly from the inlet on the cold side to the solar receiver toward the hot side. This architecture minimizes entropy production by reducing the heat transfer through large temperature gradients, and thus maximizes the efficiency of the process.

As a whole, the arrangement of components in the tube 12 makes for an efficient reforming of methane. As an example, a thin N-KB7 glazing 17 in front of the absorbing surface of the reactors 20 redirects a part of the re-radiation losses back to the reactors 30. In a same way, the radiation plates 16 are placed on both sides of the array 15 of reactors 20. The radiation plates 16 may be covered with a low emissivity and high reflectance cladding to reflect the major part of the radiations back to the array 15 of reactors 20. The remaining energy may be absorbed by the radiation plates 16, and conducted upward to heat the vaporizer portion 20B. The radiation plates 16 may for example be made of copper, or of other metals. In an embodiment, the radiation plates 16 are integrally part of the plates 30, 40 and/or 50, e.g. monoblock, and thus may be made in the same material as the plates 30, 40 and/or 50, such as stainless steel, nickel alloys, inconel, etc. The low emissivity may for example be achieved for the radiation plates 16 by polishing their exposed surfaces.

As shown in FIG. 3, both radiation plates 16 and glazing 17 may be separated from the array 15 of reactors 20 by localized void gaps. By doing so, the major heat transfer mechanism between them and the hot surfaces of the array 15 of reactors 20 is radiation. As shown in FIG. 3, there may remain a contact between the radiation plates 16 and the vaporizer portion 20B. Since the radiation plates 16 have a high conductivity, they largely remain around the temperature of the vaporizer portion 20B, e.g., through contact. The plates 16's radiation losses to ambient are consequently low as they come from low-temperature and low-emissivity surfaces.

Figure 8:
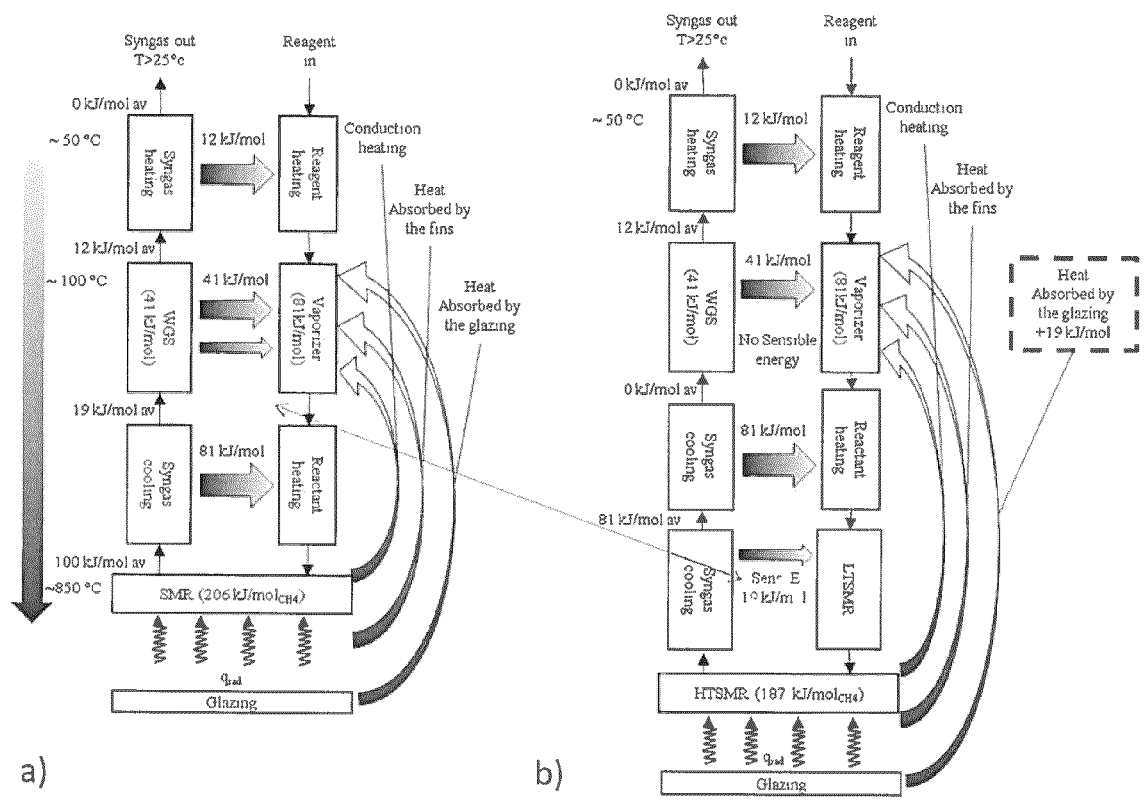
FIGS. 8A and 8B are exemplary block diagrams illustrating energy flow in the micro-reactors of the present disclosure.

Referring to FIGS. 8A and 8B, exemplary block diagrams are shown to illustrate energy flow in the micro-reactors 20. The block diagram is provided as an example and is non-limitative, and results from particular testing conditions. In FIG. 8A, 19 kJ of energy is provided to the vaporizer portion 20B by the syngas sensible energy at the exit of the syngas cooling system. The remaining vaporization energy comes from the conduction in the core of the micro-reactor 20, the energy absorbed by the radiation plates 16 and the glazing 17 as well as the heat coming out of the reactor chambers 20E-20F. In FIG. 8B, when a multi-stage SMR reactor is used, as in the embodiment of FIG. 5, the sensible energy of the syngas is partly consumed inside the low temperature SMR (LTSMR) reactor chamber 20E prior to heating the reactant. By doing so, more vaporization energy can be provided by the glazing 17 which means that the glazing 17 can be maintained at lower temperature. It is also contemplated to provide additional LTSMR reactor chambers, and the architecture may also be different.

The glazing 17 has an impact on the efficiency of the system, as it absorb losses from the high temperature reactor absorption surface and conducts a part of the energy losses to the micro-reactor's vaporizer portion 20B instead of reradiating the energy to the source and the environment, which would imply losses.

Figure 9:
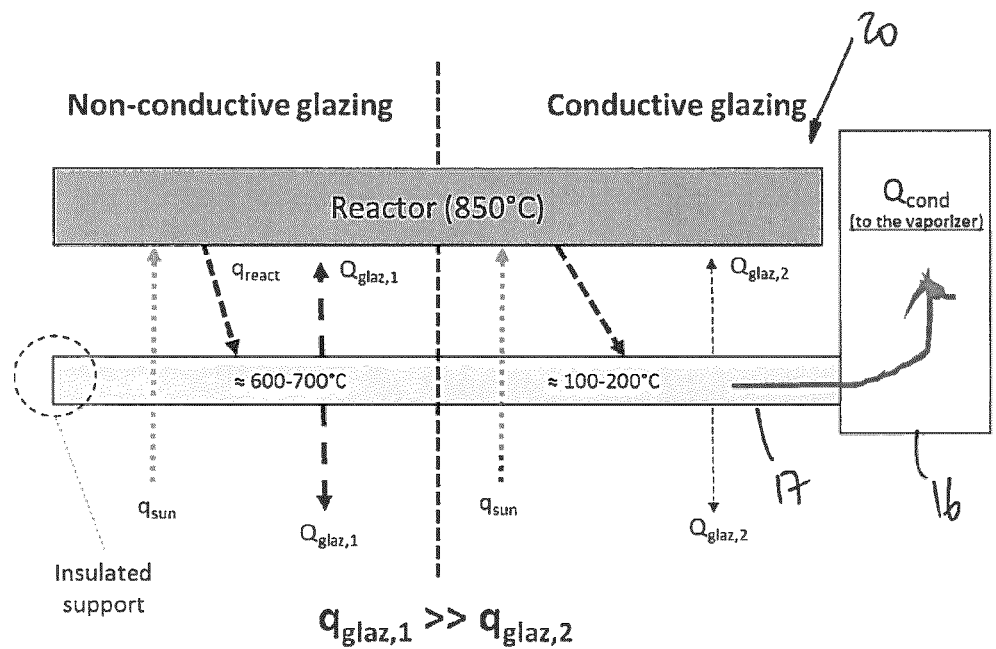
FIG. 9 is a schematic view showing a prior-art glazing configuration versus a glazing configuration in accordance with the present disclosure.

Referring to FIG. 9, there is illustrated a schematic view showing a prior-art glazing configuration versus the glazing configuration of the present disclosure. A spectrally selective glazing 17 is used for that application. The glazing transmittance spectrum is selected so that the short wavelength of the sunlight is transmitted to the reactor chambers 20E-20F and the long-wavelength infrared thermal radiations emitted by the micro-reactors 20 are absorbed or reflected back by the glazing 17. For the prior-art non-conductive glazing configuration on the left-hand side in FIG. 9, that forces the glazing temperature to increase. Consequently, it emits infrared rays back to the micro-reactors 20 via the inner surface facing the micro-reactors 20. However, the same amount of energy is also emitted to the environment from the outer surface facing away from the micro-reactors 20. If no other glazing is provided, the energy emitted by the outer surface of the glazing of the prior art configuration may be lost to the environment.

On the right-had side of FIG. 9, the glazing 17 may be thickened and is conductively joined to the radiation plates 16 (e.g., FIG. 3). As a non-limitative example, the glazing 17 has a thickness ranging from 0.25 mm to 4.0 mm. Consequently, the energy absorbed by the glazing 17 is conducted to plates 16 and provides a part of the heat needed for the vaporization. The glazing temperature is consequently reduced which leads to lower radiation losses to the environment.

Figure 10:
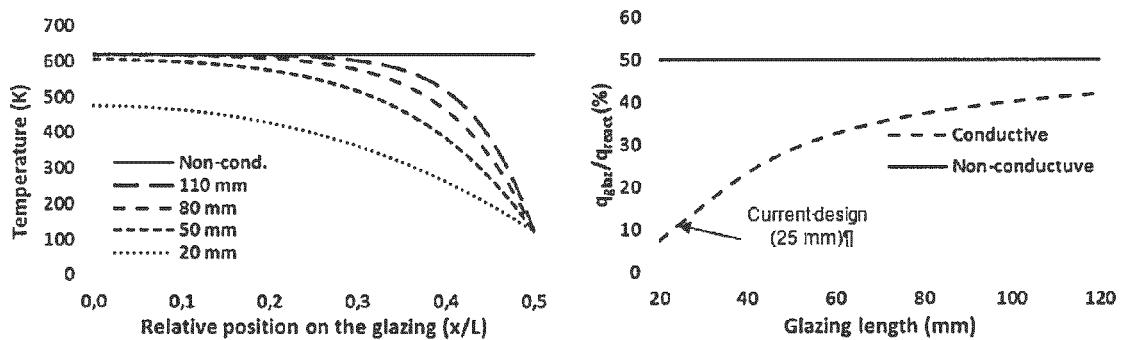
FIG. 10 shows graphs of a temperature repartition over the relative position for different glazing width, and of a portion of the radiation emitted by the reactor lost to the environment for different glazing width.

As another example, FIG. 10 shows the temperature of a 3 mm thick glazing (given as an example) from the center to one tip of the glazing for different glazing widths. According to the FIG. 10, the greater the width of the micro-reactor 20, the closer the temperature of the conductive glazing 17 is to the temperature of the non-conductive glazing (FIG. 9). Since the efficiency gain comes with lowering the temperature of the glazing 17, FIG. 10 shows the value of scaling down the micro-reactors 20. This phenomenon is well represented on the right-hand side graph of FIG. 10. At the actual design point, where the operation temperature is 850° C. and the micro-reactors 20's width is 25 mm, the conducting glazing recuperates 88% of the emitted energy from the reactor, which is 38% higher than the non-conductive glazing, using the equations (1) to (9) provided below.

Considering a thin glazing, the energy conservation equation for a short portion in the width direction (dx) is:

$$dq_{cond,glaz}(x) = [q_{react}(x) - 2 \cdot q_{glaz}(x)]dx, \quad (1)$$

Or $$\frac{dq_{cond,glaz}(x)}{dx} = q_{react}(x) - 2 \cdot q_{glaz}(x) \quad (2)$$

$$q_{cond} = -k \cdot e \frac{dt}{dx}. \quad (3)$$

Then, equation 1 and 3 imply that:

$$q_{react}(x) - 2 \cdot q_{glaz}(x) = -ke\frac{d^2 T_{glaz}}{dx^2} \quad (4)$$

$$\varepsilon_{react} \cdot \sigma \cdot T_{react}^4 - 2 \cdot \varepsilon_{glaz} \cdot \sigma \cdot (T_{glaz}(x))^4 = -ke\frac{d^2 T_{glaz}}{dx^2} \quad (5)$$

$$\frac{\varepsilon_{react} \cdot \sigma \cdot T_{react}^4 - 2 \cdot \varepsilon_{glaz} \cdot \sigma \cdot T_{glaz}^4}{-ke} = \frac{d^2 T_{glaz}}{dx^2} \quad (6)$$

Since $T_{react}$ is assumed constant, equation 6 is numerically solved to find the glazing temperature distribution over its length.

The radiation losses from the conductive glazing are then calculated with:

$$q_{lost,c-glaz} \cong \varepsilon_{glaz} \cdot \sigma \cdot \int_0^L T_{glaz}^4 \quad (7)$$

And for the non-conductive glazing:

$$q_{lost,NC-glaz} = \varepsilon \cdot \sigma \cdot T_g^4 \cdot L \quad (8)$$

Where L is the glazing width and the non-conductive glazing temperature is expressed by:

$$T_{NC-glaz} = \sqrt[4]{\frac{\varepsilon_{react} \cdot T_{react}^4}{2 \cdot \varepsilon_{glaz}}} \quad (9)$$

Consequently, the conductive connection of the glazing 17 is well suited to response to the energy needs of the vaporizer portion 20B of the micro-reactors 20. If at a design point the energy consumption of the vaporizer portion 20B is over-satisfied, the micro-reactors 20 may be operated under higher S/C ratio without significantly influencing the efficiency. In order to avoid overheating the vaporizer portion 20B with the recuperated energy coming from the glazing 17, an optimization can be done by changing the thermal conductivity of the plates 16-glazing 17 connection.

Referring to FIG. 11, another embodiment of the present disclosure is shown, and bears similarities with the embodiment of FIG. 1, whereby like elements share the same reference numerals, such as the parabolic trough 10, the mirror 11 or like reflective surface, the transparent or translucent tube 12 (e.g., with vacuum, shown fragmented to expose its interior), the supports 13, and the structure 14. In FIG. 11, the micro-reactors 20 are discrete units as opposed to a lengthwise array 15 of micro-reactors. In an embodiment, the micro-reactors 20 may be made of one or more pairs of the first plate 30 and the second plate 40, with or without end plates 50. Other constructions are possible as well. The micro-reactors 20 are also in the tube 12 and may share manifolds and tubes/pipes for feeding the reagents and receiving the reforming products. The embodiment of FIG. 11 additionally features a set of second-stage reflective concentrators 60. The concentrators 60 may be dish shaped (e.g., hemispherical). For example, each reflective concentrator 60 is dedicated to one of the discrete micro-reactors 20. The reflective concentrator 60 may be positioned to be at or near a focal line of the mirror 11, via arms 61 or other equivalent structure, which may be part of the structure 14 for example. The discrete micro-reactors 20, also referred to as units or blocks, are located on a focal spot of their associated reflective concentrator 60 for light to be focused on the micro-reactors 20 from the concentrators 60. According to an embodiment, most or each discrete micro-reactor 20 has its own radiation plates 16 and glazing 17, in the manner described above, for instance with reference to FIG. 3. According to an embodiment, the second-stage reflective concentrators 60 are interrelated by a single common actuation mechanism for sun tracking. The single common actuation mechanism may include a common link 62 pivotally connected to the arms 61. The arms 61 are themselves pivotally connected to the structure 14. Therefore, a pulling or pushing action on the common link 62 causes a change of orientation of the reflective concentrators 60 relative to the micro-reactors 20.

Figure 12:
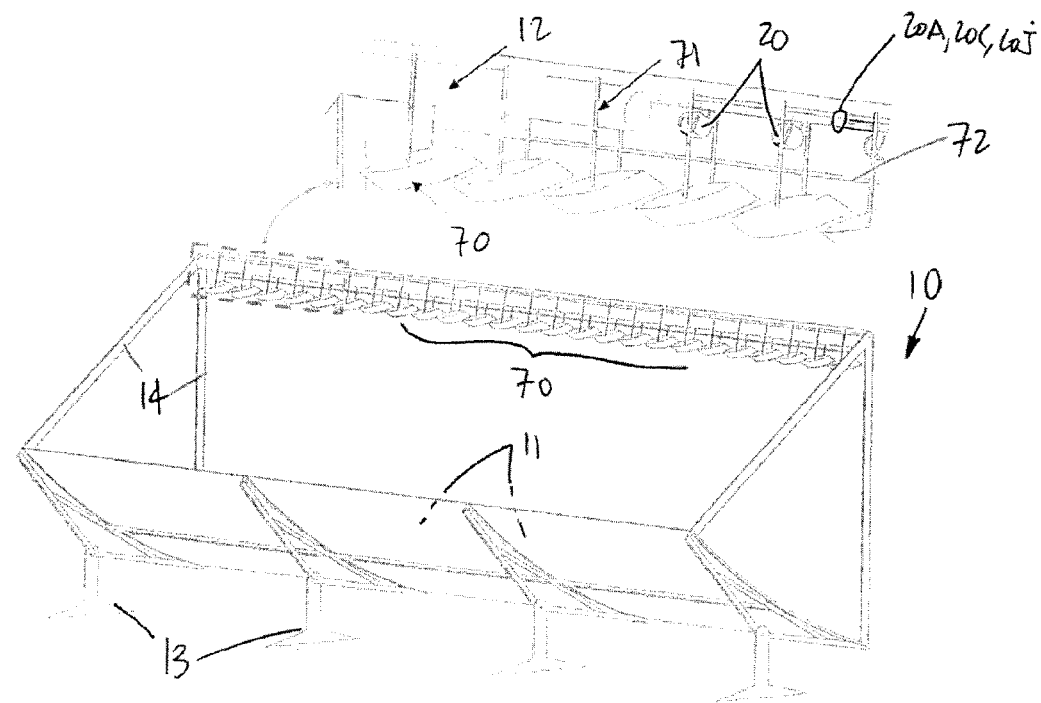
FIG. 12 is a perspective view of a parabolic trough featuring discrete micro-reactors with second-stage optical lens concentrators in accordance with another embodiment of the present disclosure.
Figure 13:
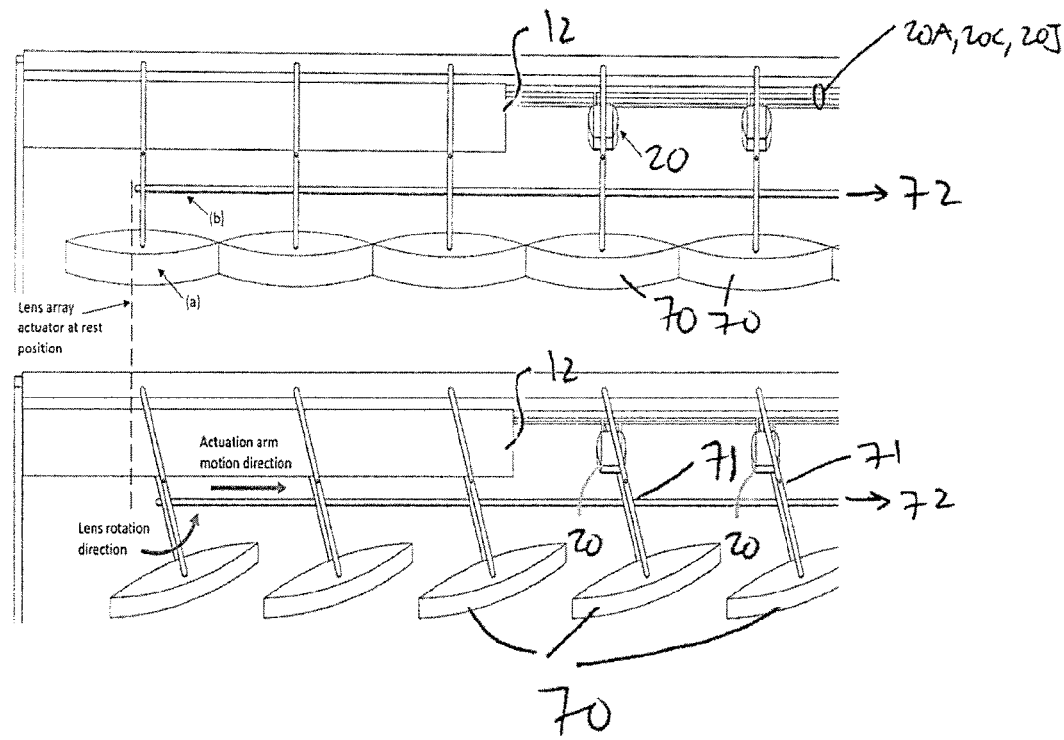
FIG. 13 is a perspective view of a change of orientation of the second-stage optical lens concentrators of FIG. 12 by an actuation mechanism.

Referring to FIGS. 12 and 13, another embodiment of the present disclosure is shown, and bears similarities with the embodiments of FIG. 1 and of FIG. 11, whereby like elements share the same reference numerals, such as the parabolic trough 10, the mirror 11 or like reflective surface, the tube 12 (e.g., with vacuum, and fragmented in FIGS. 12 and 13), the supports 13, and the structure 14. In FIGS. 12 and 13, the micro-reactors 20 are also discrete units as opposed to a lengthwise array 15 of micro-reactors of FIG. 1. The micro-reactors 20 are also in the tube 12 and may share manifolds and tubes/pipes for feeding the reagents and receiving the reforming products. Most or each discrete micro-reactor 20 may have its own radiation plates 16 and glazing 17, in the manner of FIG. 3. The embodiment of FIGS. 12 and 13 additionally features a set of second-stage optical lens concentrators 70. For example, each optical lens concentrator 70 is dedicated to one of the discrete micro-reactors 20, with the discrete micro-reactors 20 located on a focal spot of their associated lens concentrator 70. The optical lens concentrators 70 may be positioned to be at or near a focal line of the mirror 11, via arms 71 or other equivalent structure, which may be part of the structure 14 for example. The arms 71 may be pivotally connected to the structure 14. According to an embodiment, the second-stage optical lens concentrators 70 are interrelated by a single common actuation mechanism for sun tracking, similar to that of FIG. 11. The single common actuation mechanism may include a common link 72 pivotally connected to the arms 71, with a pulling or pushing action on the common link 72 causing a change of orientation of the lens concentrators 70 relative to the micro-reactors 20. FIG. 13 shows a change of orientation of the lens concentrators 71 as a function of the micro-reactors 20, as a result of an actuation of the common link 72. The common link 72 may be manually or automatically actuated. A transmission may connect the common link 72 (and 62) to a motor. As another possibility, the common links 62 and 72 are part of a hydraulic system. There results from the use of the concentrators 60 and 70 single-axis solar concentration, as a beam concentration.

Figure 14:
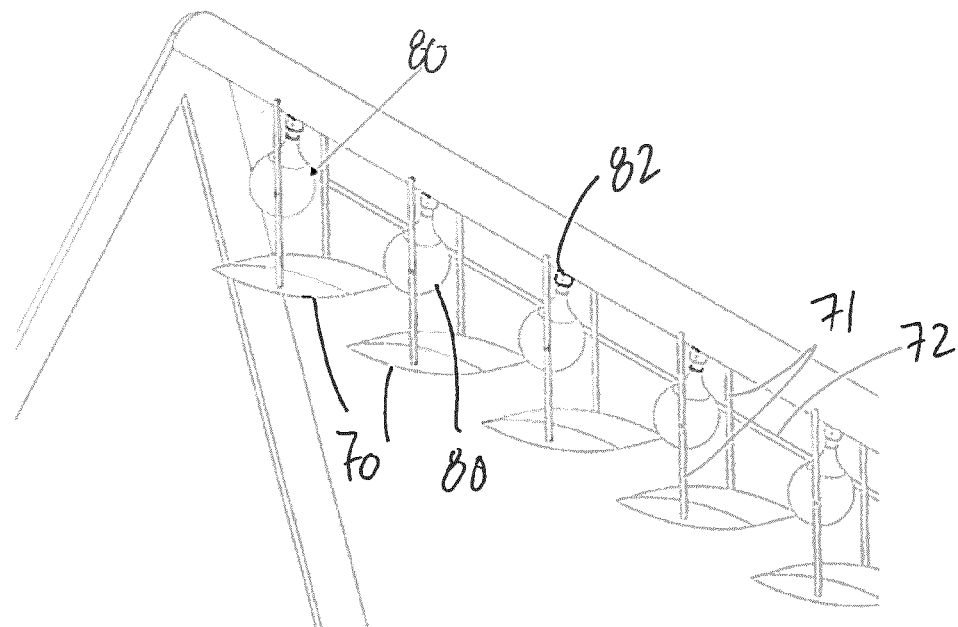
FIG. 14 is a perspective view of a parabolic trough featuring discrete micro-reactors in individual chambers with second-stage concentrators in accordance with another embodiment of the present disclosure.
Figure 15:
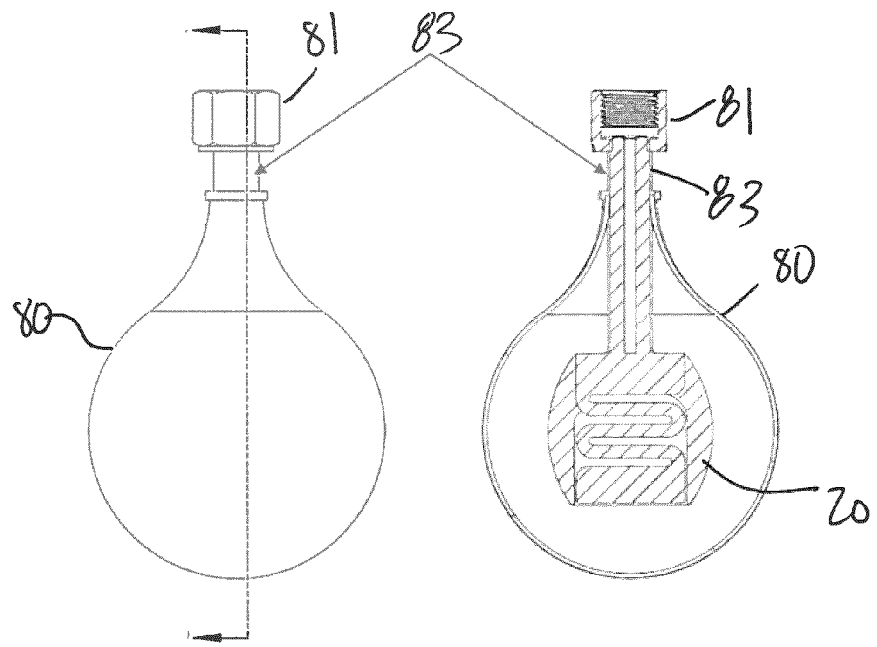
FIG. 15 is a sectional view of the discrete micro-reactors in individual chambers of FIG. 14.
Figure 16:
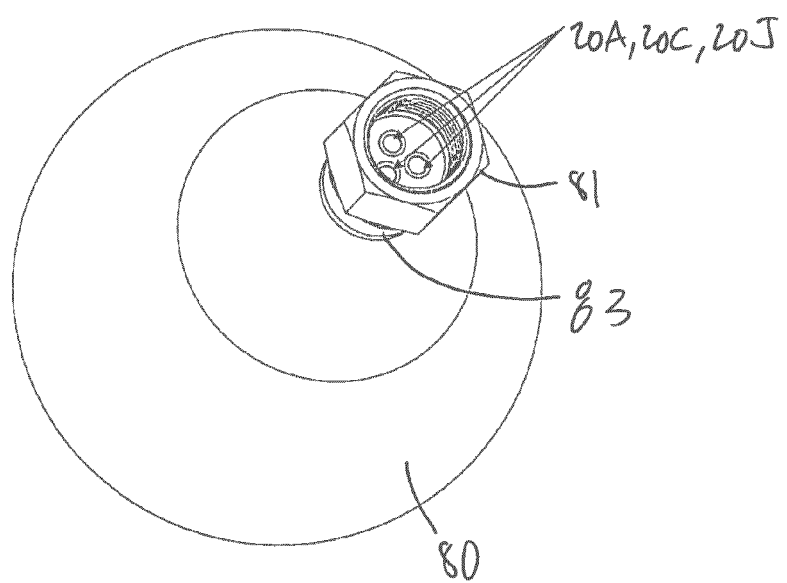
FIG. 16 is a perspective view of a socket connector of the discrete micro-reactors in individual chambers of FIG. 14.

Referring to FIGS. 14 to 16, another embodiment of the present disclosure is shown, and bears similarities with the embodiments of FIG. 1, of FIG. 11, and of FIGS. 12 and 13, whereby like elements share the same reference numerals, such as the parabolic trough 10, the mirror 11 or like reflective surface, the supports 13, and the structure 14. Moreover, the arrangement of FIGS. 14-16 may have a second-stage concentrator such as the reflective concentrator 60 of FIG. 11, or optical lens concentrator 70 of FIG. 12 and 13, for discrete micro-reactors 20 located on a focal spot of the concentrators 60,70. This may or may not include the common actuation mechanism of arms 61,71 and link 62,72. In FIGS. 14-16, the optical lens concentrators 70 are shown as the example.

In FIGS. 14 to 16, the micro-reactors 20 are also discrete units as opposed to a lengthwise array 15 of micro-reactors of FIG. 1. Most or each discrete micro-reactor 20 may have its own radiation plates 16 and glazing 17, in the manner of FIG. 3. The micro-reactors 20 are in individual chambers 80. The chambers 80 may have any appropriate shape. In an example, the chambers 80 are bulbs (e.g., light-bulb shape) that has a vacuumed interior, or interior filled with inert gas. The chambers 80, in similar fashion to the tubes 12, may be made of transparent or translucent material for light to pass through it and reaches the micro-reactors 20. The chambers 80 may also include a female socket 81 to be received in a corresponding male screw base 82. The female socket 81 may be rotatably mounted to a neck 83 supporting the chamber 80. In such an arrangement, the female socket 81 may be independently rotatable relative to the chamber 80, for screwing engagement of the micro-reactors 20 in the chambers 80, without a rotation of the chambers 80 (i.e., just the female socket 81 rotating). Each male screw 82 may then share manifolds and tubes/pipes for feeding the reagents and receiving the reforming products, from the micro-reactors 20 in the chambers 80. The reverse arrangement of male screw base connected to the chambers 80 and female sockets on the structure 14 is also contemplated. Moreover, other arrangements are considered as alternatives to the screw-type engagement of FIGS. 14-16. As shown in FIG. 15, the neck 83 may be an integral member of the micro-reactor 20. For example, the neck 83 may be part of the plates 30, 40 and 50, as one possibility. Therefore, as shown in FIG. 16, there are shown the manifold ports 20A, 20C and 20J in the bottom of the socket 81. When the chamber 80 is connected to the base 82, the manifold ports 20A, 20C and 20J fluidly connect with the manifolds on the structure 14.

Therefore, the embodiment of FIGS. 14-16 defines a chamber 80 providing an integrated thermal insulation architecture for one or more of the micro-reactors 20, with a vacuum or inert gas environment around a micro-reactor 20. In the embodiment of FIGS. 14-16 also features a single two-way connection port containing both inlet and outlet channels, for rapid integration to a manifold. Connection of the chamber 80 on the complete system involves a main manifold line feeding and exhausting each reactor working in parallel. The threaded multi-way connector contains all the necessary intake and exhaust channels and making the junction with the main line. In an embodiment, the discrete micro-reactors 20 from FIGS. 11-16 are without the radiation plates 16 and/or the glazing 17.

The present disclosure therefore discloses an approach to harvest solar energy at lower costs to reform natural gas into hydrogen. To achieve cost efficient production of hydrogen, the micro-reactors 20 in the arrays 15 constitute modular and compact units that may be fitted on low-cost parabolic troughs to replace the current existing systems. Using micro-fabrication techniques to create three-dimensional channel networks in diffusion-bonded plates in the arrays 15, all components required for methane reforming are integrated in a small unit, which is well suited for implementation on cost-effective and well-established parabolic troughs. Monolithic integration of the components allows heat recovery from the high temperature reaction to the lower temperature endothermic processes such as water vaporization and reagent preheating.

The invention claimed is:

1. A micro-reactor for a reforming process comprising a cold side and a hot side opposite the cold side, the reactor configured such that the hot side is exposed to a heat source; inlets defined in the cold side, the inlets configured for receiving reagents; an outlet defined in the cold side, the outlet configured for exiting reforming products; at least one reforming chamber in the hot side, the at least one reforming chamber having a catalyst, the at least one reforming chamber configured for reforming the reagents into the reforming products; a reagent path from the inlets to the at least one reforming chamber; a reforming product path from the at least one reforming chamber to the outlet; and wherein a wall is shared by the reagent path and the reforming product path for heat exchange between the reagents and the reforming products.

2. The micro-reactor according to claim 1, wherein the micro-reactor is a monolithic block.

3. The micro-reactor according to claim 1, wherein the at least one reforming chamber is a methane reforming chamber.

4. The micro-reactor according to claim 3, wherein the inlets include a liquid manifold and a gas manifold, and the outlet includes a products manifold, the manifolds being in the cold side of the micro-reactor.

5. The micro-reactor according to claim 4, wherein a vaporization portion is configured to receive liquid from the liquid manifold for producing steam.

6. The micro-reactor according to claim 5, further comprising a liquid-gas shift chamber downstream of the at least one reforming chamber.

7. The micro-reactor according to claim 1, including radiation plates extending on sides of the micro-reactor.

8. The micro-reactor according to claim 7, including at least one glazing facing and spaced apart from the hot side of the micro-reactor, the glazing being conductively connected to the radiation plates for heat transfer therebetween, the at least one glazing allowing light to pass therethrough to reach the micro-reactor.

9. The micro-reactor according to claim 8, wherein the radiation plates are spaced apart from the micro-reactor at the at least one reforming chamber.

10. The micro-reactor according to claim 8, wherein the radiation plates have polished exposed surfaces.

11. The micro-reactor according to claim 8, wherein the glazing is a spectrally selective glazing for transmission of short wavelength radiation through the glazing and absorption of infrared radiation or reflection of infrared radiation to the micro-reactors.

12. The micro-reactor according to claim 8, wherein the glazing has a thickness ranging from 0.25 mm to 4.0 mm.

13. The micro-reactor according to claim 1, wherein cutouts are defined in the micro-reactor between the cold side and the hot side.

14. The micro-reactor according to claim 13, wherein the reagent path and the reforming product path define coil shape via the cutouts.

15. An array of micro-reactors comprising:
a plurality of the micro-reactors according to claim 1, wherein the micro-reactors are arranged in a stack.

16. The array of micro-reactors according to claim 15, wherein the stack is constituted of an alternating sequence of a first plate and of a second plate, adjacent ones of the first plate and of the second plate forming one of said micro-reactors.

17. The array of micro-reactors according to claim 16, including end plates differing from the first plate and the second plate and located at opposite ends of the array.

18. The array of micro-reactors according to claim 16, wherein the plates are 2.5D metallic plates.

19. The array of micro-reactors according to claim 16, wherein the inlets and the outlet are manifolds defined by throughbores in the stack of first plate and second plate, the manifolds being commonly shared by the array of micro-reactors in the cold side.

20. The array of micro-reactors according to claim 16, wherein the first plates and the second plates are diffusion-bonded.

* * * * *